United States Patent [19]

Isobe et al.

[11] Patent Number: 4,604,984
[45] Date of Patent: Aug. 12, 1986

[54] AIR INTAKE SIDE SECONDARY AIR SUPPLY SYSTEM FOR AN INTERNAL COMBUSTION ENGINE

[75] Inventors: Yoshinobu Isobe, Tokyo; Hiroaki Iwasaki, Niiza, both of Japan

[73] Assignee: Honda Giken Kogyo Kabushiki Kaisha, Tokyo, Japan

[21] Appl. No.: 731,786

[22] Filed: May 8, 1985

[30] Foreign Application Priority Data

May 16, 1984 [JP] Japan ................... 59-98269

[51] Int. Cl.$^4$ ........................................... F02M 23/04
[52] U.S. Cl. .................................... 123/589; 123/327
[58] Field of Search ................. 123/327, 339, 585–589

[56] References Cited

U.S. PATENT DOCUMENTS 4,495,922 1/1985 Fujimura et al. .................... 123/589
4,541,400 9/1985 Kobayashi et al. .................. 123/589
4,553,521 11/1985 Kishida et al. ...................... 123/589

*Primary Examiner*—William A. Cuchlinski, Jr.
*Attorney, Agent, or Firm*—Birch, Stewart, Kolasch & Birch

[57] ABSTRACT

The so called air intake side secondary air supply system for an internal combustion engine includes first and second secondary air supply passages leading to an intake air passage on a downstream side of a throttle valve. The system is provided with a delay device in the second secondary air supply passage on an upstream side of an open/close valve disposed in the second secondary air supply passage, a pressure supply passage which provides communication between a pressure chamber of an air control valve disposed in the first secondary air supply passage and a part of the second secondary air supply passage between the delay device and the open/close valve, a second air supply delay means disposed in said pressure supply passage and a pressure control means for supplying a pressure for reducing the opening degree of the air control valve into said pressure supply passage during a predetermined operating condition of the engine.

3 Claims, 2 Drawing Figures

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air-fuel ratio control system for an internal combustion engine, and more specifically to the so called air intake side secondary air supply system for an internal combustion engine.

2. Description of Background Information

In an internal combustion engine provided with a three-way catalytic converter in the exhaust system, the air-fuel ratio of the mixture supplied to the engine is controlled around a stoichometric value (14.7:1 for example) by a feedback control according to the composition of the exhaust gas and operating conditions of the engine. This is because an optimum operation of the three-way catalytic converter is enabled at the stoichometric air-fuel ratio. The air intake side secondary air supply system for the feedback control is an example of this type of feedback control system and which is constructed such that an air intake side secondary air supply passage leading to a downstream side of the throttle valve is provided. The air fuel ratio control is performed by varying the amount of the secondary air flowing through the air intake side secondary air supply passage.

As an example of the air intake side secondary air supply system, a system performing a pneumatic type PI (proportional and integral) control operation is described in Japanese patent application No. 57-2127548 assigned to the same assignee of the present application. In this system, there are provided a pair of air intake side secondary air supply passages, both communicated to the downstream side of the throttle valve. The air-fuel ratio is detected in terms of a exhaust gas oxygen concentration and an air-fuel ratio signal is produced. The communication through one of the air intake side secondary air supply passages is controlled by means of an open/close valve operated in accordance with the air-fuel ratio signal. The other one of the air intake side secondary air supply passage is provided with an air control valve whose opening degree is controlled by the magnitude of the pressure applied to a pressure chamber thereof. The pressure chamber of the air control valve is supplied with one of first and second control pressures for respectively opening and closing the air control valve so that the area of the other one of the air intake side secondary air supply passage is gradually increased or decreased.

In this type of air intake side secondary air supply systems, practically, an additional air control valve is used in the first one of the air intake side secondary air supply passage so as to control the amount of the secondary air flowing therethrough in time periods when the open/close valve is opened. In addition, it is necessary to provide a three-way solenoid valve in order to introduce one of the first and second control pressures into the pressure chamber of the air control valve disposed in the second one of the air intake side secondary air supply passages. Therefore, the problem of this type of pneumatic system was that a number of parts are required and the construction becomes complicated.

Thus, it is desired to provide a relatively low cost system of pneumatic type even through this type of system does not cost higher than conventional air intake side secondary air supply systems of electrically opperated PI operation in which the control operations are performed by pulse motors.

Further, it is desirable to determine a range of the air-fuel ratio control according to operating conditions of the engine for improving the driveability of the engine and the efficiency of the purification of the exhaust gas.

An object of the present invention is therefore to provide an air intake side secondary air supply system of the PI type pneumatic control operation, which has a relatively simple construction and costs less, while maintaining enough of an air-fuel ratio control range corresponding to the operating conditions of the engine without causing the deterioration of the driveability of the engine.

According to the present invention, the air intake side secondary air supply system includes a detection means for detecting the air-fuel ratio in terms of an oxygen concentration in the exhaust gas, and producing an air-fuel ratio signal, first and second secondary air supply passages, both communicated to the downstream side of the throttle valve. The first secondary air supply passage is provided with an air control valve for controlling the amount of the air flow according to the magnitude of pressure supplied to a pressure chamber thereof and the second secondary air supply passage is provided with a first open/close valve operated by the air-fuel ratio signal. A first air supply delay device is provided in the second secondary air supply passage, on the upstream side of the first open/close valve and a pressure supply passage is provided for the communication between the pressure chamber of the air control valve and a part of the second secondary air supply passage between the first open/close valve and the first air supply delay device. The system is further provided with a second air supply delay device in the pressure supply passage, and a pressure control means for supplying an air pressure for reducing the opening degree of the air control valve, into the pressure supply passage between the second air supply delay device and the pressure chamber of the air control valve, during specific operating conditions of the engine.

Further scope and applicability of the present invention will become apparent from the detailed description given thereinafter. However, it should be understood that the detailed description and specific examples, while indicating preferred embodiments of the invention, are given by way of illusration only, since various changes and modifications within the spirit and scope of the invention will become apparent to those skilled in the air from this detailed description.

DETAILED DESCRIPTION OF A PREFERRED EMBODIMENT

The preferred embodiment of the present invention will be described hereinafter with reference to the accompanying drawings.

Figure 1:
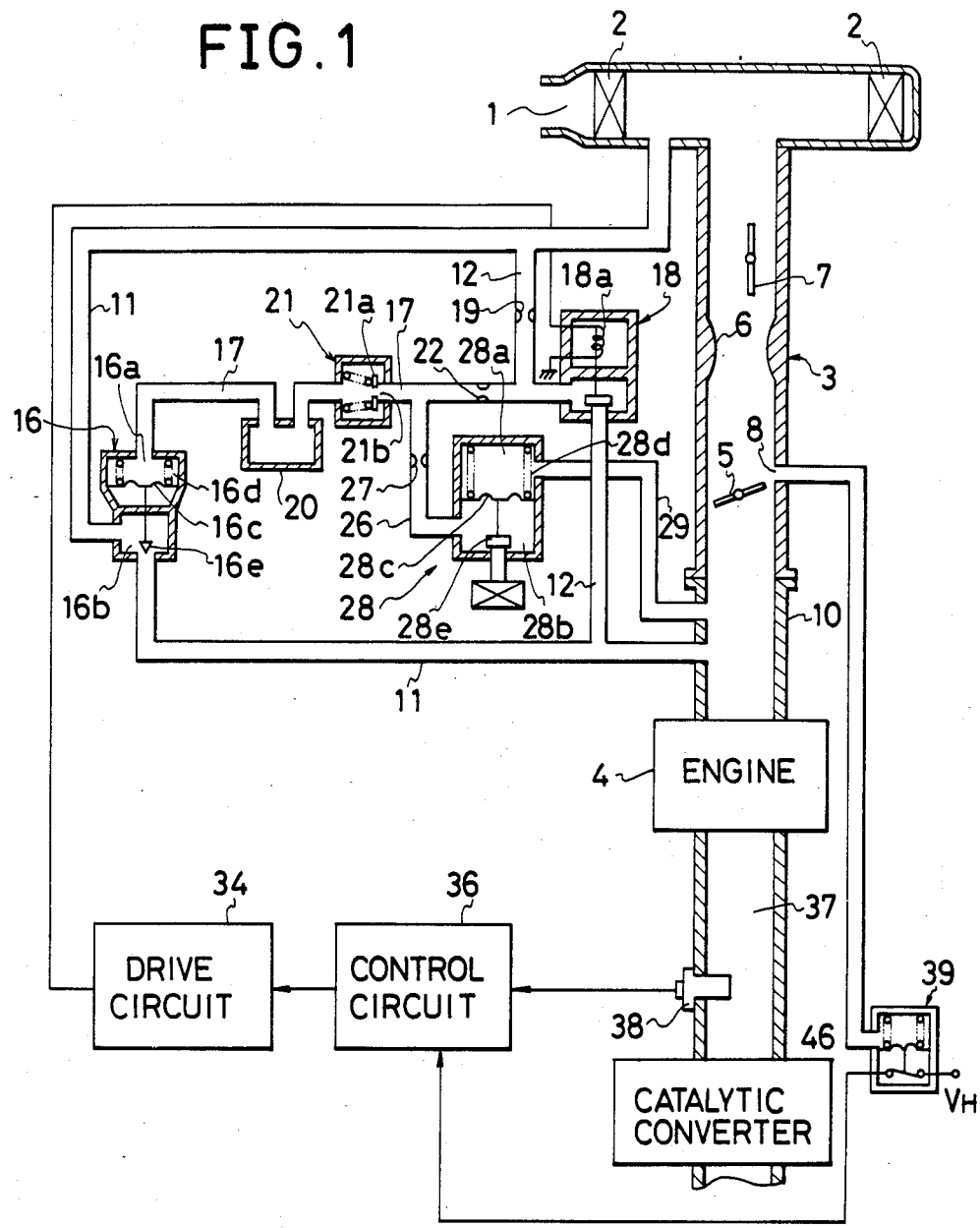
FIG. 1 is a schematic diagram illustrating the construction of an embodiment of the air intake side secondary air supply system according to the present invention.

In FIG. 1, the intake air taken at an atmospheric air inlet port 1 is drawn into an internal combustion engine through an air cleaner 2, and a carburetor 3. The carburetor 3 has a throttle valve 5 and a venturi 6 formed on the upstream side of the throttle valve 5. A choke valve 7 is provided on the upstream side of the venturi 6. In the bore of the carburetor, a vacuum detection hole 8 is provided near the throttle valve 5 in such a manner that it is on the upstream side of the throttle valve 5 when the latter is closed and on the downstream side of the throttle valve 5 when the latter is opened. Intake side secondary air supply passages 11 and 12 are provided to make communication between the inside of the air cleaner 2 in the vicinity of an air outlet port, and an intake manifold 10, i.e., downstream of the throttle valve 5. The secondary air supply passage 11 is provided with an air control valve 16 which is made up of a vacuum chamber 16a, a valve chamber 16b, a diaphragm 16c, a valve spring 16d, and a valve element 16e having a tapered form. The air control valve 16 varies the sectional area of the secondary air supply passage 11 in accordance with the magnitude of a vacuum supplied to the vauum chamber 16a, so that the area of the passage increases as the magnitude of the vacuum increases.

The air intake side secondary air supply passage 12 is provided with a solenoid valve 18 having a solenoid 18a. When the solenoid 18a is deenergized, the air intake side secondary air supply passage 12 is closed and communcation therethrough is made when the solenoid is energized. An orifice 19 is provided in the air intake side secondary air supply passage 12, on the upstream side of the solenoid valve 18. In addition, the air intake side secondary air supply passages 11 and 12 may, as shown in the figure, be respectively formed as a shunt passage communicated to the intake manifold 10.

A part of the air intake side secondary air supply passage 12 between the solenoid valve 18 and the orifice 19 is communicated with the pressure chamber 16a of the air control valve 16 by way of a pressure supply passage 17. The vacuum supply passage 17 is provided with a surge tank 20, a non-return valve 21, and an orifice 22, in this order, from a vacuum chamber 16a toward the air intake side secondary air supply passage 12. The non-return valve 21 is arranged so as to allow only an air flow from the air intake side secondary air supply passage 12 directed to the vacuum chamber 16a, i.e., the vacuum directed to the air intake side secondary air supply passage 12. On the other hand, a part of the pressure supply passage 17, between the non-return valve 21 and the orifice 22, is communicated to the atmosphere through an atmospheric pressure supply passage 26 in which an orifice 27 and a vacuum responsive open/close valve 28 upstream of the orifice 27. The open/close valve 28 is made up of a vacuum chamber 28a, a valve chamber 28b, a diaphragm 28c, a valve spring 28d, and a disc-like valve element 28e. The vacuum chamber 28a is communicated with the inside of the intake manifold 10 through a vacuum supply passage 29 and the open/close valve 28 is closed when the magnitude of the vacuum in the vacuum chamber 28a is smaller than a predetermined level $P_1$ (430 mmHg for example). On the other hand, the open/close valve 28 opens when the magnitude of the vacuum in the pressure chamber 28a becomes greater than the predetermined level $P_1$.

The solenoid 18a of the solenoid valve 18 is connected to a control circuit 36 through a drive circuit 34.

The control circuit 36 is also provided with an output signal of an oxygen sensor 38 through a buffer 41. The oxygen sensor 38 is mounted in an exhaust manifold 37 and produces the output signal whose level $VO_2$ is corresponding to an oxygen concentration of an exhaust gas and which increases as the oxygen concentration increases.

In addition to the drive circuit 34, and oxygen sensor 38, a Pc vacuum switch 39 is connected to the control circuit 36. The Pc vacuum switch 39 turns on when the magnitude of the vaccum Pc in the vacuum detection hole 8 is smaller than a predetermined level $P_2$ (30 mmHg for example) and produces a high level output signal $V_H$.

Figure 2:
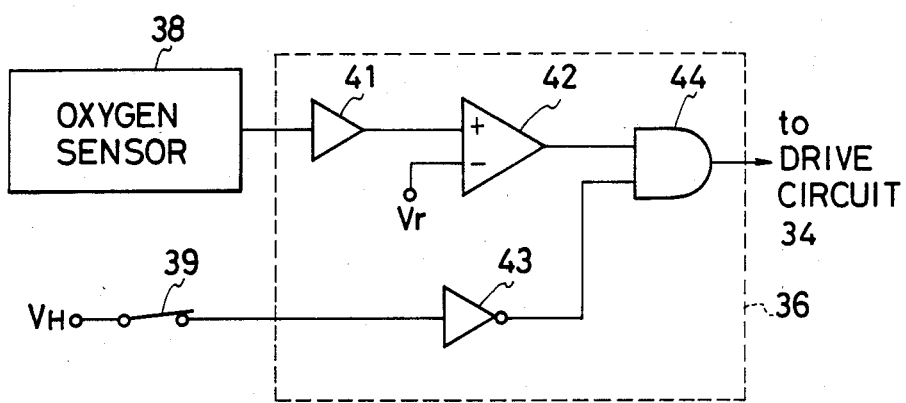
FIG. 2 is a block diagram showing the construction of the control circuit 36 of the system shown in FIG. 1.

As shown in FIG. 2, the control circuit 36 is made up of a comparator 42 for comparing the output signal $VO_2$ of the oxygen sensor 38 supplied through the buffer 41 with a predetermined reference voltage Vr corresponding to stoichiometric value of air-fuel ratio, an inverter 43 connected to an output terminal of the PC vacuum switch 39, and an AND circuit 44 for calculating logical AND between the output signal of the inverter 43 and the comparator 42. An output signal of the AND circuit 44 is supplied to the drive circuit 34.

The operation of the thus constructed air intake side secondary air supply system of the invention will be explained hereinafter.

When the air-fuel ratio is rich, the output signal level $VO_2$ of the oxygen sensor 38 becomes equal to or higher than the reference level Vr ($VO_2 \geq Vr$). Therefore, in the control circuit 36, the comparator 42 produces a high level output signal. Conversely, when the air-fuel ratio is lean, the output signal level $VO_2$ of the oxygen sensor 38 becomes lower than the reference voltage Vr ($VO_2 < Vr$). In this condition, the comparator 42 produces a low level output signal. During a normal operating condition of the engine where the engine has warmed up, the Pc vacuum switch 39 is turned off and the inverter 43 produces a high level output signal. Accordingly the variation of the level of the output signal of the AND circuit 44 becomes identical with the variation of the level of the output signal of the comparator 42. Thus, when the rich air-fuel mixture is detected in terms of the level of the output signal of the oxygen sensor 38, the AND circuit 44 produces a high level output signal which in turn is supplied to the drive circuit 34 as a rich signal. When the air-fuel ratio is detected to be lean in terms of the output signal of the oxygen sensor 38, the AND circuit produces a low level output signal which, in turn, is supplied to the drive circuit 34 as a lean signal.

When the rich signal is applied to the dirve circuit 34, the solenoid 18 is energized to open the solenoid valve 18. Thus, the communication through the air intake side secondary air supply passsage 12 is made. Conversely, when the lean signal is supplied to the drive circuit 34, the solenoid 18a of the solenoid valve 18 is deenergized to close the solenoid valve 18, which in turn, stops the communication through the air intake side secondary air supply passage 12.

On the other hand, when the opening angle of the throttle valve is relatively small under a low load operating condition of the engine such as in the "cruising" state, the magnitude of the vacuum $P_B$ in the intake manifold 10 becomes higher than a predetermined pressure value $P_1$, and the vacuum $P_B$ is in turn supplied to the vacuum chamber 28a of the open/close valve 28. As a result, the open/close valve 28 opens to provide the communcation through the atmospheric pressure supply passage 26. When, on the other hand, the opening angle of the throttle valve becomes large such as in an acceleration operation, the magnitude of the vacuum $P_B$ in the intake manifold becomes lower than the predetermined pressure value $P_1$. As a result, the open/close valve 28 is closed to close the atmospheric pressure supply passage 26.

When the solenoid valve 18 is opened from the closed state during the closure of the open/close valve 28, the secondary air is introduced into the intake manifold 10 through the orifice 19 of the air intake side secondary air supply passage 12 and the solenoid valve 18. In this state, the vacuum $P_B$ in the intake maifold 10 is supplied to the vacuum chamber 16a through the solenoid valve 18 of the air intake side secondary air passage 12, the orifice 22 of the pressure supply passsage 17, a leak hole 21b of the non-return valve 21 and the surge tank 20. Since the pressure in the vacuum chamber 16a gradually increases to reach the vacuum $P_B$ due to the effect of the residual pressures in the vacuum chamber 16a, the surge tank 20, and the leak hole 21b, the opening degree of the air control valve 16, that is, the sectional area of the air intake side secondary air supply passage 11 gradually increases. Thus the amount of the air intake side secondary air is gradually increased. In this way, the secondary air respectively flowing through the air intake side secondary air supply passages 11 and 12 are added together and supplied to the engine 4, to shift the air-fuel ratio to the lean side. The amount of the secondary air supplied to the engine gradually increases with time. In this state, the vacuum $P_B$ is diluted by the atmospheric air flowing in the air intake side secondary air supply passage 12 from the air cleaner 2. However, the magnitude of the dilution is small due to the presence of the orifice 19.

When, on the other hand, the solenoid valve 18 is closed from the open state during the closure of the open/close valve 28, the air intake side secondary air supply passage 12 is closed immediately. Therefore, the atmospheric pressure is supplied to the vacuum chamber 16a through the orifice 19 of the air intake side secondary air supply passage 12, the orifice 22, non-return valve 21, and the surge tank 20 of the pressure supply passage 17. Since the pressure in the vacuum chamber 16a rapidly approaches to the atmospheric pressure level, the opening degree of the air control valve 16, that is, the sectional area of the air intake side secondary air supply passage 11 rapidly decreases to reduce the amount of the air intake side secondary air. In other words, when the air intake side secondary air supply passage 12 is closed, the secondary air is still supplied to the engine 4 through the air intake side secondary air supply passage 11 and the amount of the secondary air supply is decreased with time.

When the air-fuel ratio is controlled by a feedback control operation, the rich signal and the lean signal are produced alternately and without interruption irrespective of the opening and closure of the open/close valve 28. Therefore, in the air intake side secondary air supply passage 11, the amount of the secondary air is increased during the presence of the rich signal, and decreased during the presence of the lean signal. Thus, the integral (I) control is performed. In the air intake side secondary air supply passage 12, the secondary air flows intermittently and the proportional control (P) takes place. Therefore, the amount of the secondary air supplied to the intake manifold becomes a sum of a proportional control part and an integral control part.

On the other hand, when the solenoid valve 18 is opened from the closed state during the open/close valve 28 is open, the secondary air is directed to the intake manifold 10 through the orifice 19 of the air intake side secondary air supply passage 12, the solenoid valve 18, the orifice 27 of the atmospheric pressure supply passage 26, and the open/close valve 28. In this state, the vacuum $P_B$ supplied to the vacuum chamber 16a through the air intake side secondary air supply passage 12 and the pressure supply passage 17 is diluted by the atmospheric air introduced through the part of the air intake side secondary air supply passage 12 on the side of the air cleaner 2 as well as the atmospheric air introduced through the atmospheric pressure supply passage 26. The degree of dilution is greater as compared with the time when the open/close valve 28 is closed. Therefore, the magnitude of the vaccum supplied to the vacuum chamber 16a of the air control valve does not reach a level at which the opening degree of the air control valve 16 is increased.

When the solenoid valve 18 is closed from the open state during the open/close valve 28 is open, the air intake side secondary air supply passage is closed immediately. The atmospheric air passed through the orifice 19 of the air intake side secondary air supply passage 12 and the orifice 22 of the pressure supply passage 17 and the atmospheric pressure passed through the open/close valve 28 and the orifice 27 of the atmospheric pressure supply passage 26 join together at a part of the pressure supply passage 17 between the orifice 22 and the non-return valve 21. After joining, the atmospheric pressure is supplied to the vacuum chamber 16a through the non-return valve 21 and the surge tank 20. The pressure in the vacuum chamber 16a becomes equal to the atmospheric pressure more rapidly than when the open/close valve 28 is closed. Therefore, when the open/close valve 28 is open, the air control valve 16 is closed irrespective of the opening and closing of the solenoid valve 18, and the air intake side secondary air supply passage 11 is closed.

As a result, when the open/close valve 28 is open, the air intake side secondary air is supplied only through the air intake side secondary air supply passage 12 through which the secondary air flows intermittently by the opening and closing of the solenoid valve 18. Thus, only the proportional control is performed.

In addition, during the gear shift operation or the deceleration condition of a vehicle on which the engine 4 is mounted, the vacuum $P_B$ in the intake manifold 10 becomes greater that the predetermined level $P_1$. Therefore, the vacuum in the vacuum chamber 16a leaks through the orifice 27 to the atmosphere immediately after the opening of the open/close valve 28. As a result, the decrease of the vacuum level in the vacuum chamber 16a is accelerated and the engine stall which might be caused by the delay of the decrease of the vacuum in the vacuum chamber 16a is prevented.

When, on the other hand, the operating condition of the engine becomes a decelerating state due to the closure of the throttle valve 5, the magnitude of the vacuum Pc supplied from the vacuum detection hole 8 to the vacuum switch 39 becomes smaller than the predetermined level and a high level output signal of the vacuum switch 39 is supplied to the inverter 43. As a result, the output signal level of the inverter 43 turns to the low level. In this state, the AND circuit 44 provides the low level signal to the driving circuit 34 regardless of the level of the output signal of the comparator 42, that is, the output signal level of the oxygen sensor 38. The drive circuit 34 in turn stops the operation of the solenoid valve 18 as in the case in which the lean signal is applied thereto. Thus, the solenoid valve 18 remains closed. With the closed solenoid valve 18, the atmospheric pressure is continuously supplied to the vacuum chamber 16a of the air control valve 16, and the air intake side secondary air passages 11 and 12 are closed. Thus the feedback control of the air-fuel ratio is stopped.

In the above described embodiment of the invention, the vacuum responsive open/close valve 28 is utilized. However, the open/close valve can be replaced by a solenoid valve whose operation is controlled according to the vacuum $P_B$ detected by a vacuum switch which, for example, is actuated when the vacuum $P_B$ is greater than the predetermined level $P_1$.

Thus, according to the present invention, two air intake side secondary air supply passages both leading to the intake air passage on the downstream side of the throttle valve are provided and one of the air intake side secondary air supply passages is provided with a first open/close valve which is opened and closed in accordance with the contents of the air-fuel ratio signal, and a first air supply delay means on the upstream side of the first open/close valve. The other one of the air intake side secondary air supply passage is provided with an air control valve whose opening degree is controlled in accordance with the pressure applied to the pressure chamber thereof, and the communication between the pressure chamber of the air control valve and a part of the secondary air supply passage on the upstream side of the open/close valve is provided by way of a second air supply delay means. Therefore, when the open/close valve is opened, the vacuum in the intake manifold, on the downstream side of the throttle valve is supplied to the pressure chamber and the atmospheric pressure is supplied to the pressure chamber when the open/close valve is closed. The opening degree of the air control valve is thus controlled. Moreover, in a predetermined operating condition of the engine an air pressure for decreasing the opening degree of the air control valve is supplied, by means of a pressure control means, into a part between the second air supply delay means and the pressure chamber. Therefore, during high load operations of the engine such as in the accelerating state of the engine, a broader range of the feedback control is enabled by the combination of the proportional control of the air intake side secondary air by means of the first open/close valve and the integral control of the air intake side secondary air by means of the air control valve. As a result, the amount of undesirable components in the exhaust gas, especially CO (Carbon Monoxide) and HC (Hydrocarbon) is reduced. During a light load operating conditions of the engine such as the cruising state or the deceleration of the vehicle, only the proportional control of the air-fuel ratio is performed, by the pressure control means. Therefore, a good response to the detected result of the air-fuel ratio in terms of the exhaust gas oxygen concentration is maintained. It is to be noted that, according to the present invention, the air-fuel ratio control of the PI operation is provided by using a relatively simple construction as a pneumatic type because one of the air intake side secondary air supply passage is utilized as a vacuum supply passage and the first open/close valve is utilized as a means for switching the air presure directed to the vacuum chamber.

What is claimed is:

1. An air intake side secondary air supply system for an internal combustion engine having a carburetor and intake air passage with a throttle valve, comprising:
   an air-fuel ratio detection means for detecting an air-fuel ratio from an oxygen concentration of an exhaust gas of the engine and producing an air-fuel ratio signal;
   a first air intake side secondary air supply passage leading to the intake air passage on downstream side of the carburetor and the throttle valve;
   an air control valve disposed in said first air intake side secondary air supply passage and adapted to vary a sectional area of the first air intake side secondary air supply passage in accordance with a magnitude of a pressure supplied to a pressure chamber thereof;
   a second air intake side secondary air supply passage leading to the intake air passage on downstream side of the carburetor and the throttle valve;
   a first open/close valve disposed in said second air intake side secondary air supply passage and opening and closing same in accordance with a content of said air-fuel ratio signal;
   a first air supply delay means disposed in said second air intake side secondary air supply passage, on upstream side of said first open/close valve;
   a pressure supply passage for communicating said pressure chamber of said air control valve with a part of said second air intake side secondary air supply passage between said first open/close valve and said first air supply delay means;
   a second air supply delay means disposed in said pressure supply passage; and
   a pressure control means for supplying an air pressure for reducing an opening degree of said air control valve into said pressure supply passage between said second pressure supply delay means and said pressure chamber of the air control valve, during a predetermined operating condition of the engine.

2. An air intake side secondary air supply system as set forth in claim 1, wherein said predetermined operating condition of the engiine is a low load operating condition of the engine.

3. An air intake side secondary air supply system as set forth in claim 1, wherein said pressure control means comprises an atmospheric pressure supply passage communicated to a part of said pressure supply passage between said second pressure supply delay means and said pressure chamber, a second open/close valve disposed in said atmospheric presure supply passage and adapted to open during said predetermined operating condition of the engine, and a third air supply delay means disposed in said atmospheric pressure supply passage.

* * * * *